United States Patent [19]

Kamiyama et al.

[11] Patent Number: 4,982,359

[45] Date of Patent: Jan. 1, 1991

[54] SYSTEM AND METHOD FOR RECOGNIZING VEHICLE POSITION ON ELEVATED FREEWAY

[75] Inventors: Hiroshi Kamiyama, Tokyo; Makoto Kimura, Kanagawa, both of Japan

[73] Assignee: Nissan Motor Company, Ltd., Japan

[21] Appl. No.: 435,134

[22] Filed: Nov. 13, 1989

[30] Foreign Application Priority Data

Nov. 18, 1988 [JP] Japan ................. 63-290237

[51] Int. Cl.⁵ ............................. G06F 15/50
[52] U.S. Cl. ......................... 364/443; 364/449; 73/178 R; 340/988
[58] Field of Search ............... 364/443, 444, 449; 73/178 R; 340/990, 988, 995

[56] References Cited

U.S. PATENT DOCUMENTS

| | | | |
|---|---|---|---|
| 4,442,609 | 4/1984 | Senoo | 33/356 |
| 4,642,776 | 2/1987 | Matsumoto et al. | 364/444 |
| 4,757,455 | 7/1988 | Tsunoda et al. | 340/995 |
| 4,882,689 | 11/1989 | Aoki | 364/449 |

FOREIGN PATENT DOCUMENTS 63-109319  5/1988  Japan .

*Primary Examiner*—Gary Chin
*Attorney, Agent, or Firm*—Lowe, Price, LeBlanc, Becker & Shur

[57] ABSTRACT

A system and method for recognizing an elevated vehicle running environment are disclosed in which, when a detected vehicle speed exceeds a predetermined speed and is continued for a predetermined time, the system and method determine that a predetermined running condition is satisfied, then, the system and method detect the steering angle of the steering wheel of the vehicle and determine whether the accumulated value of the steering angle data exceeds a predetermined value, if yes, the system and method determine that the vehicle is running on an elevated freeway. Thus the reliability of recognition for elevated running environments can be remarkably improved for vehicular navigation systems.

7 Claims, 2 Drawing Sheets

SYSTEM AND METHOD FOR RECOGNIZING VEHICLE POSITION ON ELEVATED FREEWAY

BACKGROUND OF THE INVENTION (1) Field of the Invention

The present invention is applicable to a vehicular navigation system and relates generally to a system and method for recognizing the running environment of a vehicle, whether the vehicle is running on an elevated freeway, a regular highway or ordinary streets.

(2) Background of the Art

Various types of systems for providing running environment information for a vehicle driver have recently been proposed. One of the above-described systems is a navigation system.

One of the previously proposed navigation systems is exemplified by Japanese patent application First Publication No. (Showa) 63-109319 published on May 14, 1988.

The navigation system disclosed in the above-identified Japanese patent application First Publication estimates the position of the vehicle whenever the vehicle has passed through an intersection on the basis of data on the running environment, i.e., mapped data on roads, intersections, distances between the intersections, and orientations, and directional data detected by a geomagnetic sensor and displays the data on a map on a screen of a display unit. The above-mentioned system also determines a route to a predetermined destination on the basis of this data.

The above-described navigation system, when put into practice, uses a flat plane (two-dimensional) to display the mapped data described above to provide information on the generally complicated road network found chiefly in urban areas.

However, taking the recent road environment into account, since elevated freeways are often built above city streets, and may in fact parallel some main streets, accurate data mapping becomes very complicated. To optimize such a navigation system it is desirable to display simultaneously ground level streets and elevated freeways in order to provide the driver with accurate running environment data and enable accurate identification of these roads.

To achieve the above-described and other objects, three dimensional data preparation in addition to the flat plane data described above has been considered.

However, in a case where three dimensional data is modeled by the previously proposed navigation system the following problem will occur.

That is to say, since the data on ground-level roads and data on elevated roads (freeways) are handled at the same level, the three-dimensional data is treated as two-dimensional data. Therefore, these roads are displayed on the same line based on the scale of the map. In a case where the ground level road and elevated freeway run parallel to each other, both cannot be accurately identified. In addition, when one or both roads branch from a parallel state, a deceptive intersection appears at the branching point above. Therefore, increased processing time results due to unnecessary route determining operations and the possibility of generating erroneous route and/or position data is increased.

On the other hand, if the above-described data is not handled simultaneously, i.e, each type of data is used separately according to necessity, the problem will be solved. In this case, extremely accurate identification between ground level roads and elevated freeway is prerequisite, and, an extremely important problem is introduced in that if the system provides deceptive information, subsequent route and position estimation will become impossible after an erroneous recognition is carried out.

SUMMARY OF THE INVENTION

It is an object of the present invention to provide a system and method for recognizing whether a vehicle is running on an elevated freeway or a ground-level street or highway.

The above-described object can be achieved by providing a system for recognizing an elevated running environment, comprising: (a) first means for detecting vehicle speed and determining that a predetermined running condition is satisfied when a detected vehicle speed exceeds a predetermined speed for a predetermined time; (b) second means for detecting the steering angle of a steering wheel when the predetermined running condition is satisfied; (c) third means for accumulating the steering angle data detected by the second means; (d) fourth means for determining whether the accumulated steering angle data exceeds a predetermined value; and (e) fifth means for determining that the vehicle runs on an elevated freeway when the fourth means determines that the accumulated steering angle data exceeds the predetermined value.

The above-described object can also be achieved by providing a method for recognizing an elevated running environment, comprising the steps of: (a) detecting vehicle speed and determining that a predetermined running condition is satisfied when the detected vehicle speed exceeds a predetermined speed and is continued for a predetermined time; (b) detecting the steering angle of a steering wheel when the predetermined running condition is satisfied; (c) accumulating the steering angle data detected in step (b); (d) determining whether the accumulated steering angle data exceeds a predetermined value; and (e) determining the vehicle runs on a elevated freeway by determining that the accumulated steering angle data exceeds the predetermined value in step (d).

DETAILED DESCRIPTION OF THE PREFERRED EMBODIMENT

Reference will hereinafter be made to the drawings in order to facilitate a better understanding of the present invention.

Figure 1:
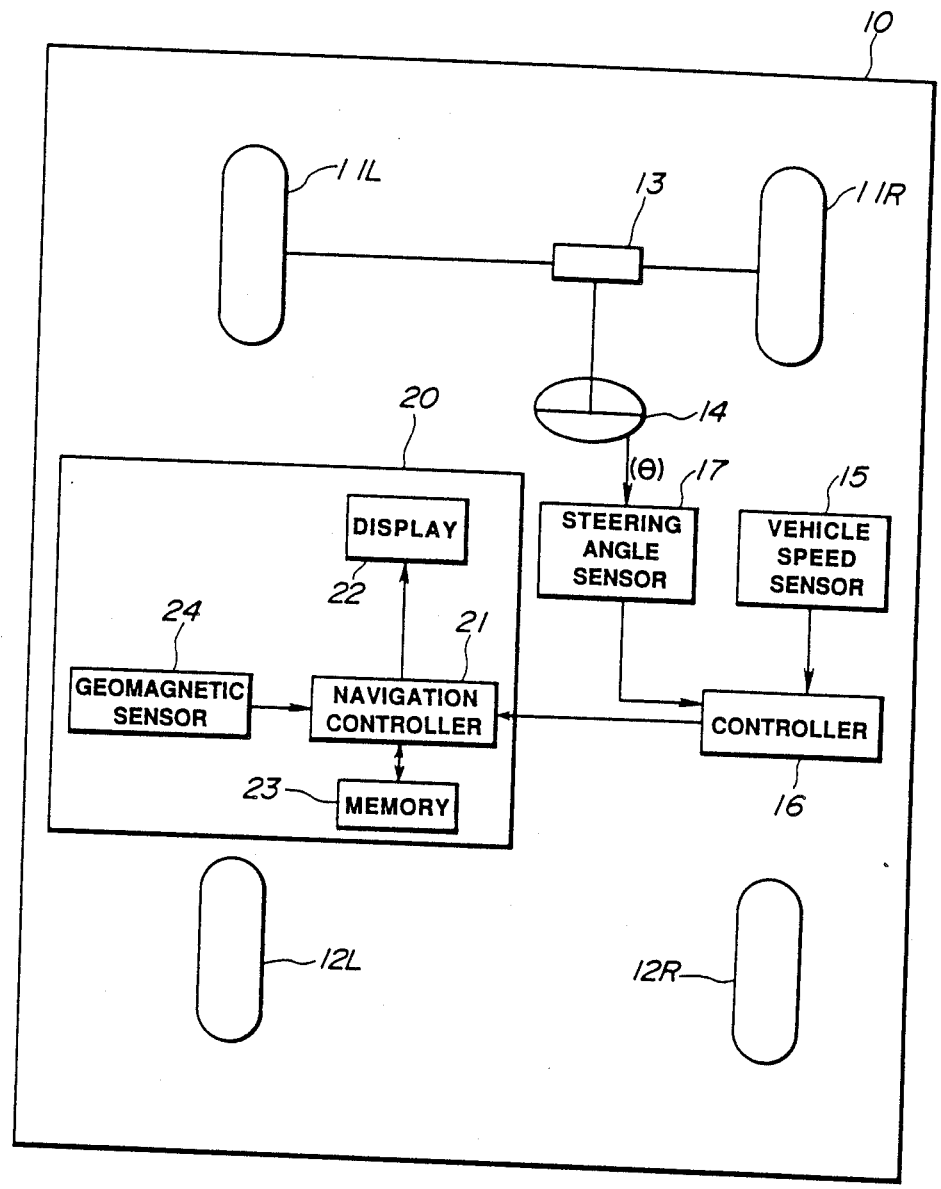
FIG. 1 is a circuit block diagram of a system for recognizing vehicle run on an elevated freeway in a preferred embodiment according to the present invention.

FIG. 1 shows a circuit block diagram of a system for recognizing a vehicle run on an elevated freeway in a preferred embodiment according to the present invention.

A vehicle 10 includes left front wheel 11L, right front wheel 11R, left rear wheel 12L, and right rear wheel 12R.

The front wheels 11L, 11R are connected to a steering wheel 14 via a steering gear 13. The wheel is driven by means of power derived from an engine (not shown)

so that the front wheels 11L, 11R are steered according to the steering angle of the steering wheel 14.

Vehicle speed V, detected by a vehicle speed sensor 15, is input into a controller 16.

The steering angle $\theta_1$ of the steering wheel 14 detected by the steering angle sensor 17 is input into the controller 16.

A navigation system 20 is provided having a navigation controller 21, display 22, memory 23, and geomagnetic sensor 24. The navigation system is exemplified by U.S. Pat No. 4, 757, 455 issued on July 12, 1988 and U.S. Pat. No. 4, 743, 913 issued on May 10, 1988, the disclosures of which are hereby incorporated by reference.

The geomagnetic sensor 24 is exemplified by U.S. Pat. No. 4,442,609, the disclosure of which is hereby incorporated by reference.

The navigation controller 21 retrieves mapped data on the running environment stored in a memory 23, e.g., roads, intersections, distances between the intersections, and the direction (with respect to North) of the vehicle on the basis of input information derived from the controller 16 and geomagnetic sensor 24 and displays the estimated running course of the vehicle on a display unit 22 to execute the service of providing running environment information to the driver. In the mapped data stored in memory, both ground level and elevated roads (including freeways, expressways, elevated ramps, bridges etc.) are included. It is noted that in place of the geomagnetic sensor, any sensor which can provide data on the present position of the vehicle may be used. For example, a device which can receive electromagnetic waves from, e.g., satellite stations (a so called, GPS device) may also be used.

Figure 2:
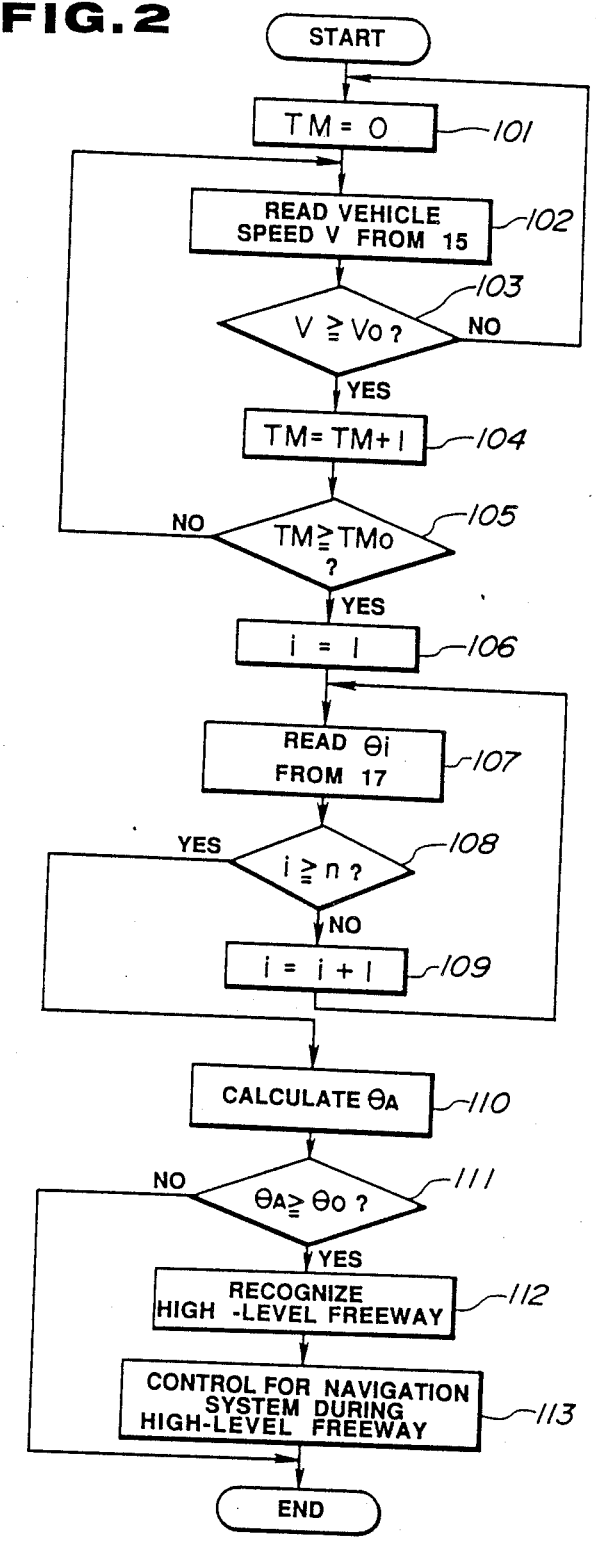
FIG. 2 is an operational flowchart for the controller shown in FIG. 1.

The controller 16 executes a program shown in FIG. 2 according to information input from the vehicle speed sensor 15 and steering angle sensor 17 and performs navigation system control on the basis of running environment recognition.

In FIG. 2, a timer TM is reset in a step 101. Then, in a step 102, the CPU constituting the timer TM reads the vehicle speed V from the vehicle speed sensor 15.

In the next step 103, the CPU determines whether the vehicle speed exceeds a predetermined speed Vo. The predetermined speed Vo is set at, e.g., 80 Km/h, a speed slightly below statutory maximum speeds for elevated roads such as freeways which often have statutory speed limits of around 100 km/h, for example.

When, in the step 103, the controller 16 determines that the vehicle runs at a speed V above the predetermined speed Vo, the controller 16 increments the timer TM in a step 104. The incrementing of the timer TM is repeated in a loop as steps 102, 103, 104, 105, and back to the step 102 until the accumulated time on the timer TM is determined to be above a predetermined time TMo in a step 105. In a case where the vehicle speed V is below the predetermined speed Vo, the speed requirement, which is a determining factor in the preferred embodiment, is not met. In this case the routine resets to the step 101 at which the timer TM is reset. It is noted that the predetermined time TMo may be set to a higher value than a time during which a continuous run at a speed above the predetermined speed would be possible on ground-level road.

When the time in the determination of the step 105 is determined to be above the predetermined time TMo, i.e., a high speed run above the predetermined speed Vo continues for more than the predetermined time TMo, a counter i is set to 1 and the steering angle $\theta_1$ (i=1, 2, . . . , n) is read from the steering angle sensor 17. The reading of the steering angle sensor is repeated in the steps 107, 108, 109, and back to 107 until the value of the counter i, incremented in the step 109, reaches a value n. Then the routine goes to a step 110 to carry out the following calculation. That is to say, the accumulated value $\theta_A$ of the steering $$\theta_A = \sum_{i=1}^{n} |\theta_i|.$$

In a step 111, the controller 16 determines whether this accumulated value $\theta_A$ exceeds a predetermined value $\theta_o$.

It is noted that the predetermined value $\theta_o$ is set to a value which would not be present in a case where a vehicle was running on a relatively straight ground level freeway (e.g., a ground-level Interstate Highway) so that the system may recognize the vehicles' running environment as being elevated due to the presence of large-radius turns which are a common feature of many elevated freeways, owing to the presence of ramps and change-overs as well as to geographic and city-planning considerations which may determine a freeyways' path through an urban area. Hence, if the accumulated value $\theta_A$ exceeds the predetermined value $\theta_o$, the controller 16 recognizes in a step 112 that the running environment is an elevated freeway. Then, in the next step 113, the controller 16 carries out control operations on the navigation system 20 relative to running on an elevated freeway.

In a case when $\theta_A > \theta_o$ in a step 111, the control cycle is ended since the steering angle conditions for recognizing an elevated freeway are not found.

A example of the above-described control will be described below.

As the running environment to be controlled may include a ground level road which runs parallel to an elevated freeway, for example, or which is extremely proximate to an elevated freeway as recorded on a map included in the navigation systems memory, and which at some point may branch away from this parallel run state, the prefered embodiment of the invention makes determinations regarding the running environment based on the following factors.

The above-described road conditions may discriminated by the speed determination in the step 103. In addition, even if the step 103 is cleared, the determination of continuous running time in the step 105 may be used to discriminate an elevated freeway run. Also, it will be noted that, should the operating conditions for an elevated freeway be met during ground-level operation at a point where the maps stored in the system memory show no access or proximity to an elevated road, the controller 16 will maintain the navigation system 20 in the ground-level operation mode. Therefore, erroneous recognition of an elevated freeway cannot occur.

Since, as viewed from most urban driving situations, the amount of time a vehicle runs on ground level is predominantly larger than the amount of time the vehicle would spend on an elevated freeway, the system defaults to the ground level operation mode when it cannot distinctly recognize an elevated running environment. This is a reasonable control parameter for an inter-urban navigation system.

Additionally, since during a run on an elevated freeway, e.g., a Los Angeles Expressway, many continuous curves with few straight portions may be encountered, radius of each curve being remarkably large as compared with ground level road, the accumulated steering angle is increased. Hence, the accumulated value $\theta_A$ of the steering angle value $\theta_i$ during an interval executed n number of times is read in the step 107, at which recognition between elevated freeway and ground level road can be accomplished.

In this way, during a run on elevated freeway, the accumulated value $\theta_A$ will exceed the predetermined value $\theta_o$ (as stated, $\theta_o$ is set to a value not likely to be present on ground level road), the controller can recognize in the step 112 that an elevated running environment is present (it is noted that from the systems' default state, the above-described recognition will carried out only after high speed running becomes possible).

Once the system recognizes an elevated running environment, the elevated freeway operating mode is thereafter continued. Thus, during a run on elevated freeway, the system carries out control of the navigation system 20 according to the requirements of an elevated running environment, e.g., the display of map data etc. pertinent only to elevated driving on the display unit 22 through identification means such illumination, flashing indicators or so on, even though both ground level and elevated road data is available to the systems' memory 23. It is noted that when the vehicle exits an the elevated freeway, an exit control program (not shown) may be used to reset the system with respect to the exit point.

In this way, the reliability of running environment recognition in both ground-level and elevated environments can be remarkably improved.

In a case where a vehicle runs on a ground level highway (or a non-elevated freeway), the navigation system handles the run in the same way as a ground level road run. Therefore, it is possible for the system to accurately discriminate an elevated running environment under all driving conditions.

Since no traffic signals are present during a run on elevated freeway, intersection by intersection estimation of the vehicle route is hardly needed (however, on freeways elements such as branches, exits, on/off ramps, interchanges and rest stops may be used to plot route data) therefore, due to the reduced amount of locational data present under freeway driving conditions, high-speed processing of the data can be achieved. The probability of erroneous or sluggish determination of vehicle location is remarkably reduced.

In the preferred embodiment, recognition of an elevated running environment is the principle criterion used in control for the navigation system. However, the recognition system described above may also be used for engine control, instrument settings, etc.

As described hereinabove, the requirements for a complete system and method for recognizing an elevated running environment are satisfied. Therefore, reliable environment recognition can be achieved. Thus, an elevated running environment information service through a navigation system can be provided for the driver.

It will fully be appreciated by those skilled in the art that the foregoing description has been made in terms of the preferred embodiment and various changes and modifications may be made without departing from the scope of the present invention as defined by the appended claims.

What is claimed is:

1. A system for recognizing an elevated vehicle running environment, comprising:
   (a) first means for detecting a speed of a vehicle and determining that a predetermined running condition is satisfied when the detected vehicle speed exceeds a predetermined speed for a predetermined time;
   (b) second means for detecting a steering angle of a steering wheel when the predetermined running condition is satisfied;
   (c) third means for accumulating the steering angle data detected by the second means;
   (d) fourth means for determining whether the accumulated steering angle data exceeds a predetermined value; and
   (e) fifth means for determining that the vehicle runs on an elevated freeway when the fourth means determines that the accumulated steering angle data exceeds the predetermined value.

2. A system as set forth in claim 1, which further comprises sixth means for providing control for a navigation system mounted in a vehicle during the run of said vehicle on said elevated running environment.

3. A system as set forth in claim 1, wherein the fifth means determines that the vehicle is running on a ground level road when the fourth means determines that the accumulated steering angle does not exceed the predetermined value.

4. A system as set forth in claim 1, wherein the predetermined speed is set to a value slightly below a statutory maximum speed for freeway driving.

5. A system as set forth in claim 4, wherein the predetermined-speed is 80 Km/h.

6. A system as set forth in claim 1, wherein the predetermined time is set to a value larger than a time during which the vehicle could run at a speed exceeding the predetermined speed under ground level driving conditions.

7. A method for recognizing an elevated running environment comprising the steps of:
   (a) detecting a speed of a vehicle and determining that a predetermined running condition is satisfied when the detected vehicle speed exceeds a predetermined speed and is continued for a predetermined time;
   (b) detecting the steering angle of a steering wheel when the predetermined running condition is satisfied;
   (c) accumulating the steering angle data detected in step b;
   (d) determining whether the accumulated steering angle data exceeds a predetermined value; and
   (e) determining the vehicle runs on an elevated freeway by determining that the accumulated steering angle data exceeds the predetermined value in step (d).

* * * * *